United States Patent
Orekhov

(10) Patent No.: US 6,908,954 B2
(45) Date of Patent: Jun. 21, 2005

(54) COATING COMPOSITION FOR ARTISTIC REPRODUCTIONS

(75) Inventor: Mikhail M. Orekhov, Toronto (CA)

(73) Assignee: Brushstrokes Fine Art Inc., Toronto (CA)

( * ) Notice: Subject to any disclaimer, the term of this patent is extended or adjusted under 35 U.S.C. 154(b) by 176 days.

(21) Appl. No.: 10/134,289

(22) Filed: Apr. 29, 2002

(65) Prior Publication Data

US 2002/0123539 A1 Sep. 5, 2002

Related U.S. Application Data

(63) Continuation of application No. 09/634,892, filed on Aug. 9, 2000, now abandoned.

(51) Int. Cl.$^7$ ............................. C08K 7/20; C08K 7/28
(52) U.S. Cl. ................... 523/219; 427/393.5; 427/429; 523/223; 524/494
(58) Field of Search ................ 523/219, 223, 523/494; 427/393.5, 429; 524/494

(56) References Cited

U.S. PATENT DOCUMENTS

| | | | |
|---|---|---|---|
| 3,262,805 A | | 7/1966 | Aoki |
| 3,265,805 A | | 8/1966 | Carlan et al. |
| 4,017,493 A | | 4/1977 | Ferment et al. |
| 4,045,600 A | | 8/1977 | Williams |
| 4,128,519 A | * | 12/1978 | Bartoszek et al. ........... 523/406 |
| 4,148,955 A | | 4/1979 | Breitenfellner et al. |
| 4,185,000 A | * | 1/1980 | Gebauer et al. ............. 524/494 |
| 4,305,863 A | * | 12/1981 | Adachi et al. ............... 523/214 |
| 4,391,930 A | * | 7/1983 | Olson ......................... 523/219 |
| 4,489,108 A | * | 12/1984 | Postle et al. ................. 427/164 |
| 4,798,854 A | * | 1/1989 | Visca et al. .................. 523/334 |
| 4,811,402 A | * | 3/1989 | Ward .......................... 381/322 |
| 4,876,302 A | | 10/1989 | Noll et al. |
| 5,266,622 A | * | 11/1993 | Mazanek et al. ........... 524/131 |
| 5,667,747 A | | 9/1997 | Harding et al. |
| 5,702,111 A | * | 12/1997 | Smith ......................... 277/650 |
| 5,736,602 A | * | 4/1998 | Crocker et al. ............. 524/494 |
| 5,854,342 A | * | 12/1998 | Kirochko et al. ........... 524/805 |
| 5,863,638 A | | 1/1999 | Harvey |
| 5,910,556 A | | 6/1999 | Wamprecht et al. |
| 5,922,398 A | * | 7/1999 | Hermes et al. .............. 427/137 |
| 5,981,033 A | | 11/1999 | Haunschild et al. |
| 6,413,011 B1 | * | 7/2002 | Sobczak et al. .............. 404/72 |
| 6,506,156 B1 | * | 1/2003 | Jones et al. ................. 600/439 |
| 6,520,261 B1 | * | 2/2003 | Janoff et al. ................ 166/350 |
| 6,613,830 B2 | * | 9/2003 | Stevenson et al. .......... 524/501 |

FOREIGN PATENT DOCUMENTS

| | | | |
|---|---|---|---|
| GB | 2208078 | * | 2/1989 |
| JP | 55-089373 | | 7/1980 |
| JP | 01-242670 | | 9/1989 |
| JP | 6-10319 A | | 1/1994 |
| JP | 11-50378 A | | 2/1999 |

* cited by examiner

Primary Examiner—Peter Szekely
(74) Attorney, Agent, or Firm—Alston & Bird LLP

(57) ABSTRACT

A synthetic resin containing glass beads is used as a coating for artistic reproductions to lend a realistic texture to the surface of the artistic reproduction. Surprisingly, the glass beads provide in the synthetic resin coating a canvas-like or natural feel as well as look. The sizes of the glass beads may range anywhere from 40 to 450 microns in diameter.

21 Claims, No Drawings

COATING COMPOSITION FOR ARTISTIC REPRODUCTIONS

CROSS-REFERENCE TO RELATED APPLICATION

This application is a continuation of U.S. application Ser. No. 09/634,892 filed on Aug. 9, 2000 and now abandoned, which is hereby incorporated herein in its entirety by reference.

FIELD OF THE INVENTION

The present invention relates to coatings used to protect and/or enhance the surface of artistic images.

BACKGROUND OF THE INVENTION

There is a large and increasing demand for reproductions of original works of art that accurately reflect both the true color and texture of the original.

U.S. Pat. No. 5,667,747 describes a process and apparatus for molding a thin sheet of thermoplastic material into an accurate three-dimensional relief image that mimics the brushstrokes of the original art. While this reproduction is a great improvement over two-dimensional photograph-like reproductions, the surface of the reproduction has a smooth plastic-like feel and the degree of gloss or shine tends to be constant over the entire surface. In original paintings, some areas naturally tend to be glossier than others due to, for example, the quality, age and amount of oil in the pigment used. Particularly in works of art which combine mixed media, there are areas which have different degrees of glossiness and/or texture.

With both original works of art and reproductions, protective coatings are often used to prevent damage to the image due to wear and tear, ultraviolet radiation, etc. When dealing with reproductions on a material such as PVC, the coating should have certain characteristics. The composition must be one that adheres well to PVC both in the wet and dry states. It should not interact with the pigments of the image or with the PVC material itself and the coating should not discolor or obscure the image, rather it should provide enhanced wearability and abrasion resistance.

Various types of coatings have been used to protect original artistic images. These include, for example, varnishes, waxes and synthetic resins. Certain finishes, such as acrylic gel containing sand, are sometimes used by artists to create special effects. While these coatings may be suitable for certain types of original artwork, they are not very effective as coatings on artistic reproduction on thermoplastic material. Acrylic gel, for example, does not adhere well to PVC and the finish easily peels off.

It is known to produce polyurethane coatings on PVC. U.S. Pat. Nos. 3,265,805, 4,017,493 and 4,045,600 describe processes for coating PVC using one component or two component polyurethane systems. However, the use of solvent containing coating agents presents problems both in terms of the health of the worker and in terms of reactivity with the substrate to be coated. U.S. Pat. No. 4,876,302, addresses this problem by disclosing aqueous coating compositions suitable for use as coating and finishing agents for PVC surfaces.

A further problem associated with many of the available coatings for PVC is that they provide a smooth homogenous cover while the surface of an original painting often has a degree of texture. This texture is due to both the composition of the paint used and the inherent texture departed by the canvas on which the image is painted. Thus, there remains an unmet need for a coating composition for artistic images, particularly reproductions on thermoplastic materials, that can impart realistic texture to the surface.

Synthetic resins incorporating glass beads are known. For example, JP11050378 discloses water-proofed cloth which is coated with polyurethane containing glass beads. The cloth provides superior waterproofness, luminescence and re-reflecting properties. U.S. Pat. No. 5,981,033 discloses pavement marking tape in which glass beads which reflect incident light are held in a polyurethane binder. JP06010319 discloses a road mark material which comprises glass beads having a diameter of about 50 to 3000 microns in a reactive oligomer. The coating is designed to have good abrasion resistance. However, while synthetic resin compositions including glass beads are known, their use as a coating for imparting surface texture to an artistic reproduction is novel.

The present invention addresses the problems of the prior art by providing a coating composition and a method of coating an artistic reproduction that results in a surprisingly realistic texture on the surface of an artistic reproduction.

SUMMARY OF THE INVENTION

An object of an aspect of the present invention is to provide a coating for use on artistic reproductions that interacts well with thermoplastic materials, does not detract from the image and actually enhances the quality of reproduction.

In accordance with one aspect of the invention, the use of a synthetic resin containing glass beads as a coating for use on artistic reproductions is disclosed.

In accordance with another aspect of the invention, a method is provided for imparting surface texture to an artistic reproduction comprising adding glass beads to a synthetic resin to form a coating composition and applying said coating composition to the artistic reproduction.

In accordance with a further aspect of the invention, there is provided a coating composition for use on artistic reproductions comprising a synthetic resin and glass beads having a diameter of about 40 to 420 microns.

DETAILED DESCRIPTION OF THE INVENTION

As discussed above, there are problems associated with the current state of the art reproductions that are available in terms of the surface texture which influences how a reproduction feels and looks. In spite of the many types of coatings that are available for various purposes, none meet the requirements of retaining brilliant visual effects while imparting a textured feel and look to the surface of an artistic reproduction.

The present invention is directed to the surprising result that, by incorporation of glass beads into a synthetic resin coating, the plastic-like surface of a reproduction can be replaced by a canvas-like, natural feel and look.

In accordance with the present invention, there is provided a process for coating an artistic reproduction. Depending on the image to be coated, a basic coating is selected from gloss, semi-gloss or matte finishes. The type of finish to be selected is based on the appearance of the original art work. A size of glass bead is then selected usually from a range of diameters of about 40 to 420 microns. The beads may be in size groupings of about 40 to 80, 80 to 150, 150 to 210 and 300 to 420 microns. Typically larger beads will be selected for larger images and smaller diameter beads will be selected for smaller images. The original image will also dictate the size of bead to be used. For example, if an original which has a stonelike appearance is to be reproduced, then larger beads will be used to impart a rougher feel to the surface. About 1 to 4 parts of beads are mixed with about 2 to 8 parts of a gloss, semi-gloss or matte synthetic resin based coating. Approximately 1 part beads to 7 parts of polyurethane has been found to be particularly effective. The beads are mixed with the polyurethane to form a slurry. The glass beads/polyurethane mixture is then applied to the painting based on an artist's interpretation of the original. The coating may be applied to the overall surface of the reproduction or only to specific areas. Compositions comprising different sized beads in different finishes, e.g gloss or matte, may be applied to different parts of the same image. The polyurethane base has been found to adhere well to the surface in both the dry and wet stages. Upon drying the coating provides texture to the surface without interfering with visibility.

While the coating composition has been described particularly with respect to PVC surfaces, it is clearly apparent that the coating can be used to enhance the surface feel of other substrates such as polyurethane, epoxy, melamine, acrylic resins and similar smooth surfaces. The coating can also be used on other types of reproductions such as canvas transfers and laminates.

Various types of synthetic resins and combinations thereof can be used as a base for containing the glass beads. For example, acrylic/polyurethane compositions are very effective.

EXAMPLE 1

A water-borne two-part polyurethane-acrylic coating cross-linked with a substituted imine ester such as that sold by Aqua Surface Technology Coating Products is selected in a semi-gloss finish. Glass beads having a diameter in the range of about 44 to 88 microns are added to the polyurethane-acrylic coating in a ratio of 1 part beads to 7 parts coating and mixed. Immediately before use, the composition is again mixed to provide an even distribution of glass beads. An artist then uses a brush to pick up an amount of the coating composition including the glass beads and applies the mixture to the surface of an artistic reproduction that has been prepared on PVC. The mixture is applied to the image at the artist's discretion in accordance with the nature of the image.

Although preferred aspects of the invention have been described herein in detail, it is understood that variations may be made thereto without departing from the spirit of the invention or the scope of the amended claims.

What is claimed is:

1. A method of simulating a surface texture of an original painting on the surface of an artistic reproduction, said method comprising the stops of:
   i) providing a composition comprising a synthetic resin and glass beads;
   ii) applying said composition to at least a portion of the surface of said artistic reproduction; and
   iii) allowing said composition to dry on the surface of said reproduction wherein, upon drying, the surface of said reproduction attains the surface texture in areas where the composition was applied.

2. The method of claim 1, wherein said composition is applied by band using a brush.

3. The method of claim 1, wherein said synthetic resin component comprises polyurethane.

4. The method of claim 2, wherein said synthetic resin component comprises polyurethane.

5. The method of claim 1, wherein said synthetic resin component comprises polyurethane and acrylic.

6. The method of claim 2, wherein said synthetic resin component comprises polyurethane and acrylic.

7. The method of claim 1, wherein said glass beads have a diameter of about 40 to 420 microns.

8. The method of claim 2, wherein said glass beads have a diameter of about 40 to 420 microns.

9. The method according to claim 8 wherein said glass beads have a diameter of about 40 to 80 microns.

10. The method according to claim 8 wherein said glass beads have a diameter of about 80 to 150 microns.

11. The method according to claim 8 wherein said glass beads have a diameter of about 150 to 210 microns.

12. The method according to claim 8 wherein said glass beads have a diameter of about 300 to 420 microns.

13. The method of claim 1 wherein said composition comprises said synthetic resin and said glass beads in an aqueous dispersion.

14. The method of claim 1 wherein said composition is a slurry.

15. The method of claim 1 wherein said composition comprises from about 2 to 8 parts of said synthetic resin and from about 1 so 4 parts of said glass beads.

16. The method of claim 15 wherein said composition comprises 7 parts of said synthetic resin and 1 part of said glass beads.

17. The method of claim 1 wherein at least two compositions are applied to said surface of said artistic reproduction for simulating said surface texture of said original painting on said surface of said artistic reproduction.

18. The method of claim 17 wherein one of said at least two compositions comprises different sized glass beads and a different finish compared to an other of said at least two compositions.

19. The method of claim 1 wherein said artistic reproduction has a surface selected from the group consisting of polyvinyl chloride, polyurethane, epoxy, melamine, acrylic resins, canvas transfers, and laminates.

20. The method of claim 1 wherein said composition comprises 7 parts of said synthetic resin and 1 part of said glass beads, said synthetic resin comprising polyurethane and acrylic and said glass beads having a diameter of about 44 to 88 microns.

21. The method of claim 1 wherein said composition is applied to all of said surface of said artistic reproduction.

* * * * *